(12) United States Patent
Frangioso et al.

(10) Patent No.: US 7,734,947 B1
(45) Date of Patent: Jun. 8, 2010

(54) SYSTEM AND METHOD FOR VIRTUAL INTERFACE FAILOVER WITHIN A CLUSTER

(75) Inventors: Robert B. Frangioso, Randolph, MA (US); Ronald W. Kownacki, Pittsburgh, PA (US); Tianyu Jiang, Export, PA (US)

(73) Assignee: NetApp, Inc., Sunnyvale, CA (US)

(*) Notice: Subject to any disclaimer, the term of this patent is extended or adjusted under 35 U.S.C. 154(b) by 474 days.

(21) Appl. No.: 11/736,197

(22) Filed: Apr. 17, 2007

(51) Int. Cl.
*G06F 11/00* (2006.01)
(52) U.S. Cl. .............................. 714/4; 714/13
(58) Field of Classification Search ........................ None
See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,633,999 A | 5/1997 | Clowes et al. | |
| 5,781,770 A | 7/1998 | Byers et al. | |
| 5,812,748 A | 9/1998 | Ohran et al. | |
| 5,812,751 A | 9/1998 | Ekrot et al. | |
| 5,819,292 A | 10/1998 | Hitz et al. | |
| 5,951,695 A | 9/1999 | Kolovson et al. | |
| 6,119,244 A | 9/2000 | Schoenthal et al. | |
| 6,292,905 B1* | 9/2001 | Wallach et al. | 714/4 |
| 6,532,494 B1* | 3/2003 | Frank et al. | 709/224 |
| 6,625,749 B1 | 9/2003 | Quach | |
| 6,671,773 B2 | 12/2003 | Kazar et al. | |
| 6,715,098 B2 | 3/2004 | Chen et al. | |
| 6,728,897 B1 | 4/2004 | Cramer et al. | |
| 6,748,429 B1* | 6/2004 | Talluri et al. | 709/221 |
| 6,760,304 B2 | 7/2004 | Uzrad-Nali et al. | |
| 6,763,479 B1 | 7/2004 | Hebert | |
| 6,775,702 B2 | 8/2004 | Oeda et al. | |
| 7,058,846 B1* | 6/2006 | Kelkar et al. | 714/4 |
| 7,158,972 B2 | 1/2007 | Marsland | |
| 7,184,445 B2 | 2/2007 | Gupta et al. | |
| 7,213,045 B2 | 5/2007 | Uzrad-Nali et al. | |
| 7,225,356 B2* | 5/2007 | Monitzer | 714/12 |
| 7,260,737 B1 | 8/2007 | Lent et al. | |
| 7,296,068 B1 | 11/2007 | Sarma et al. | |
| 7,299,294 B1* | 11/2007 | Bruck et al. | 709/235 |
| 7,340,639 B1 | 3/2008 | Lee et al. | |
| 7,356,608 B2 | 4/2008 | Rimmer | |

(Continued)

OTHER PUBLICATIONS

Bhide, A., et al., "A Highly Available Network File Server," Proceedings of the Winner 1991 USENIX Conference, Jan. 21-25, 1991, pp. 199-205.

*Primary Examiner*—Gabriel L Chu
(74) *Attorney, Agent, or Firm*—Cesari and McKenna LLP

(57) ABSTRACT

A cluster-wide published configuration system and method is provided for assigning host nodes to virtual interfaces (VIFs) in a cluster of data storage systems. A coordinating VIF manager publishes a set of failover rules using a replication database. The coordinating VIF manager monitors VIF hosting status within a cluster. In the event of a VIF failure, the coordinating VIF manager publishes a reassignment of host nodes using a single read-write transaction of a replication database service. Secondary VIF managers in the cluster must perform VIF hosting in accordance to the reassignment. If a secondary VIF manager can not activate an assigned VIF it must publishing new reassignment of VIF hosts via the replication database service.

26 Claims, 7 Drawing Sheets

U.S. PATENT DOCUMENTS

| | | | |
|---|---|---|---|
| 7,467,191 | B1 | 12/2008 | Wang et al. |
| 7,496,782 | B1* | 2/2009 | Kownacki ...................... 714/4 |
| 7,606,239 | B2 | 10/2009 | Maveli et al. |
| 7,617,289 | B2* | 11/2009 | Srinivasan et al. .......... 709/209 |
| 2002/0073354 | A1* | 6/2002 | Schroiff et al. ................. 714/4 |
| 2002/0087912 | A1* | 7/2002 | Kashyap ...................... 714/13 |
| 2002/0188711 | A1* | 12/2002 | Meyer et al. ................ 709/223 |
| 2003/0018927 | A1* | 1/2003 | Gadir et al. .................... 714/4 |
| 2003/0105866 | A1* | 6/2003 | Colrain et al. .............. 709/225 |
| 2003/0115350 | A1 | 6/2003 | Uzrad-Nali et al. |
| 2004/0030668 | A1 | 2/2004 | Pawlowski et al. |
| 2004/0081087 | A1 | 4/2004 | Shea |
| 2004/0268017 | A1 | 12/2004 | Uzrad-Nali et al. |
| 2008/0120177 | A1* | 5/2008 | Moscirella et al. ............ 705/14 |

* cited by examiner

VIRTUAL INTERFACE

| | |
|---|---|
| IP ADDRESS | *510* |
| NETMASK | *520* |
| ROUTES | *530* |
| VIF ID | *540* |
| VIRTUAL SERVER ID | *550* |
| SET OF NETWORK PORTS AS POSSIBLE HOSTS | *560* |

*500*

SYSTEM AND METHOD FOR VIRTUAL INTERFACE FAILOVER WITHIN A CLUSTER

BACKGROUND OF THE INVENTION

1. Field of the Invention

The present invention relates to virtual interfaces on storage system clusters, and more particularly to failover of virtual interfaces in a clustered environment.

2. Background Information

In a clustered data storage system, data access via the well known Network File System (NFS) and Common Interface File System (CIFS) protocols relies on the availability of client-facing virtual interfaces (VIFs) hosted on the data ports of nodes in the cluster. A VIF consists of an IP address, virtual server ID, virtual interface ID, and various associated pieces of information (netmask, routes, etc). Continuity of a file system service requires that VIFs be available and that they failover in response to network port failure, network interface failure, cable failure, switch port failure, or storage system failure. VIF failover typically requires relocating a VIF to a different hosting port, either in local node or a remote node.

A VIF manager attempts to maintain one-and-only-one active instance of each

VIF in the cluster at all times. To prevent discontinuities in CIFS service and NFS service through a Transmission Control Protocol (TCP) connection, the VIFs should not failover too quickly in response transient errors. Furthermore, a VIF should never be active on two different ports at any given time. Therefore, the system must ensure that all potential hosting node for any particular VIF agree on the current hosting rules for the VIF, at least to the extent that two hosting nodes never claim simultaneous responsibility for hosting a particular VIF.

A previously known method for providing virtual interface failover uses a quorum mechanism such as a replication database (RDB) service. This method designates one VIF manager as a coordinator on the RDB quorum master node. The coordinator monitors VIF manager health based on the RDB quorum. Each VIF manager instance monitors its local network port status based on a network link status reported by a network module. When node failure or network link failure is detected, the new VIF hosting port/node is published in the VIF configuration database. A message is then written to the hosting nodes' event record through one RW RDB transaction.

In response to the event record update notification delivered by RDB service, the new hosting nodes wake up and initiate read-only (RO) transactions to read their messages. Each new hosting node then opens a read-write (RW) transaction to read the VIF configuration database for newly assigned VIFs, and brings up the newly assigned VIFs. This method uses a number of RW transactions that is proportional to the number of nodes involved in the VIF failover when activating the newly failed over VIFs. It is desirable to minimize the number of RW transactions because RDB service can perform only one RW transaction at a time across the cluster. Therefore, the use of RW transactions serializes the failover operations and limits concurrency in the cluster. RO transactions, by comparison, can be performed by accessing a local copy of the replicated database.

The ability to perform failover transactions in a quorum-based system has been limited because upon large scale failover many servers in a cluster simultaneously require the same scarce resource, i.e., access to the RDB RW transaction. VIF managers have been required to retry the failover process upon unavailability of RW transactions.

SUMMARY OF THE INVENTION

The present invention improves the performance and reliability of the prior art by providing a cluster-wide published configuration system and method for assigning host storage systems or nodes to virtual interfaces (VIFs) in a cluster of nodes using a single RW transaction. A VIF manager instance runs on each node in the cluster. The VIF manager instances use RDB to store their configuration information and use the RDB quorum mechanism to determine a node's suitability for data VIF hosting. RDB also serves as a mechanism for signaling other nodes when they have been configured to host a new VIF.

One VIF manager instance, designated as the coordinator, is responsible for reassigning the VIFs of nodes that are down by opening a single RW transaction to publish the updated configuration as a whole to copies of a replicated database residing on each node. The other instances of the VIF manager in the cluster are responsible for hosting their assigned VIFs in response to the new configuration. The VIF manager instances use RO transactions to read the new configuration.

The embodiments described herein efficiently reassign virtual interfaces to host nodes in the event of an interface failure. The inventive failover process is initiated when enough time has passed after an interface failure to ensure that an interface failure is not a transient or self-correcting condition. The failover process attempts to ensure that each virtual interface is serviced by one and only one host node at any particular time.

A VIF manager resides on each host node of the cluster. A replication service, such as RDB for example, also resides on each host node. The replication service allows each VIF manager to access a current interface assignment table. One of the host nodes that is running the replication service is designated as a master. The VIF manager that resides on the master node is designated as the cluster's coordinating interface manager, hereinafter referred to as the "coordinator." The VIF managers that are running on nodes other than the master node are designated as secondary managers. The coordinator also acts as a secondary manager for its own node. The coordinator and secondary managers form a quorum of the replication service.

The coordinator is responsible for monitoring the overall hosting status of each of the hosting nodes and applying failover rules to reassign hosting of virtual interfaces in response to failures. The secondary managers stand by to perform services on their respective hosting nodes in response to instructions provided from the coordinator via the replication service.

All of the VIF managers in the cluster agree on a list of virtual interface hosting assignments and failover rules for reassignment of the virtual interfaces. When all host nodes and virtual interfaces of the quorum are operating without failure, all of the VIF managers activate their assigned virtual interfaces.

When a VIF manager drops out of the quorum, it deactivates its virtual interfaces. A suitable delay is provided before the virtual interfaces are deactivated to ensure that the failure condition is not a transient or minor communication fault. The delay thereby prevents unnecessary interruptions of CIFS service involving the affected virtual interfaces.

The coordinator notes the unhealthy manager, and after a similar delay, calculates new hosting rules based on the available healthy VIF managers. The coordinator then publishes changes to the virtual interface assignment table. The publication is performed using a single read-write transaction. The replication service notifies all of the VIF managers that an update has occurred. Upon receiving a replication service notification, the VIF managers scan their local databases to learn their new hosting responsibilities. The scanning operations used to update hosting assignments use read-only transactions that are less costly than the read-write transactions used in some previous methods. In response to learning the new hosting responsibilities, the VIF managers then activate their newly assigned interfaces.

When the coordinator assigns a hosting responsibility to an online secondary manager, the secondary manager either fulfills the responsibility or reassigns tasks. If the secondary manager is able to fulfill all of its new hosting responsibilities, then there is no need for any additional costly RW communications.

If a secondary manager is unable to fulfill its responsibility, for example if a local error prevents it from activating its assigned interfaces, the secondary manager recognizes the error, reapplies the failover rules for the interfaces that it cannot host, and then publishes new hosting rules. The new hosting rules are published by the secondary manager using a single new RW transaction in the same manner that the original rules were published by the coordinator. Only this subsequent failure necessitates an additional RW transaction.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION

Figure 1:
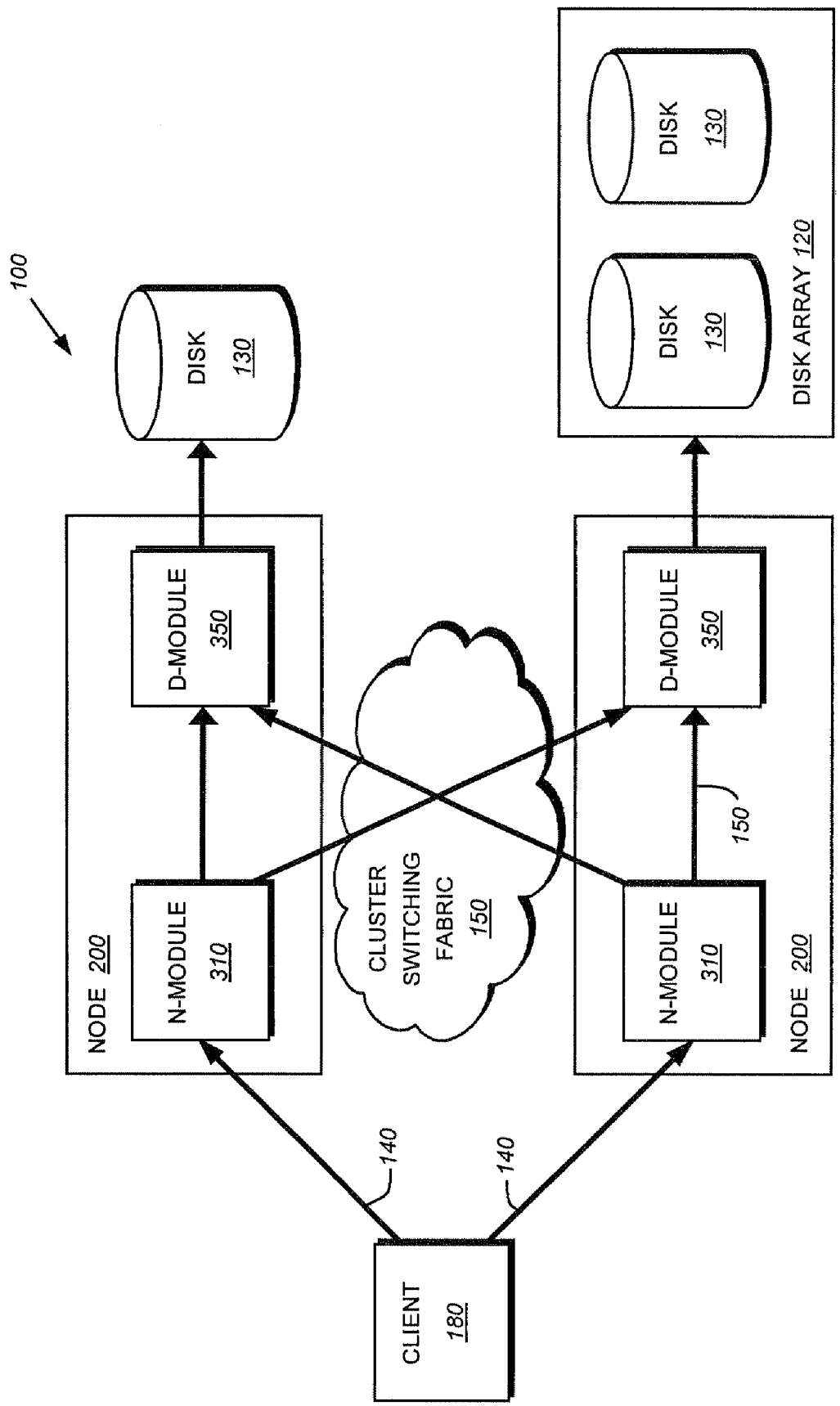
FIG. 1 is a schematic block diagram of a plurality of nodes interconnected as a cluster in accordance with an embodiment of the present invention.

In a storage system cluster, a set of independent storage systems or nodes employ cluster-aware middleware to form a single logical system. A replication database (RDB) is an example of such middleware which provides a quorum-based persistent data replication service. The RDB provides the infrastructure for such wide-ranging tasks as maintenance of a single-system image within system management, transactional handshaking during interface failover, and the cluster-wide propagation of volume location information to support autonomous function in segmented networks. The RDB supports system management applications that execute within a cluster. A simple application programming interface (API) provides transactional access to the persistent data.

To use the RDB service, an application can link with an RDB C++ library, and then access its persistent data through an RDB transactional interface. The RDB infrastructure ensures that all updates are synchronously propagated to the other instances of the application, which are hosted on the other nodes in the cluster. This propagation yields a replication ring wherein each instance's locally stored persistent data is identical to that of the other instances. Each application has its own independent RDB replication ring and underlying quorum.

An illustrative RDB cluster configuration consists of a defined set of replication sites, all of which are known to one another. Each node can serve as a full replication site. The cluster configuration is retained in a "sitelist", and contains a cluster name and identifier (ID), and also the names, IDs, and internet protocol (IP) addresses of each member site. The cluster configuration is accessible via system management, but the sitelist representation is replicated data which is under the control of the RDB service. The various RDB replication rings operate independently, but share the common configuration given by the sitelist.

Each replication site hosts instances of all the RDB-based applications. A quorum can be formed within a replication ring whenever a simple majority of healthy instances are able to establish and maintain communication with one another. Each instance that is capable of reliably storing data can function as an active replica in a replication ring. One instance is internally designated as the RDB "master" which is tasked with the job of maintaining the quorum. In general, any instance can perform the role of master.

The RDB service synchronizes all in-quorum instances with one another so that each will see the same version of data. Once a quorum is established, the RDB service will attempt to maintain the quorum. If an instance becomes unhealthy it will be temporarily dropped from the quorum, but the RDB service will attempt to bring it back as soon as possible. Additional instances will be brought into the quorum whenever possible.

An in-quorum application instance can read or modify RDB data. In an illustrative embodiment, the in-quorum instance can open a read-write (RW) transaction, make the modifications locally (in-memory), and commit the transaction. The RDB service provides a successful return code to the instance if the update has been synchronously propagated to a quorum of healthy replicas and each of the healthy replicas has locally committed. The commitment of a transaction by a majority of instances (a quorum) assures that any future quorum will contain at least one member that has seen the update, and thereby assures that the update will be permanent.

The RW transaction is a scarce resource. Only one RW transaction can be active at a time within a replication ring. Furthermore, the commitment of transactions is expensive because it involves a round of remote procedure calls to implement synchronous propagation. Contrarily, read-only (RO) transactions allow instances to read RDB data reliably and inexpensively.

If an instance can not commit to a particular transaction and must drop out of quorum, the RDB service provides a failure return code. The outcome of the transaction resulting in a failure return code is determined by quorum agreement. If any member of the quorum received the transaction and was able to commit the update, then the update will carry forward. If the failure involved a complete quorum breakdown, then the outcome of the transaction will be determined when the next quorum is formed.

Any offline application instance is disconnected from the quorum. Such disconnections are usually due to transient conditions which are generally quickly remedied. An offline instance only has read access to the data which is frozen at the version that was current the last time the instance was online. Some RDB applications can continue to fulfill their major responsibilities while offline, but others must operate in a degraded mode.

A VIF manager instance runs on each node in the cluster. The VIF manager instances use RDB to store their configuration information and use the RDB quorum mechanism to determine a node's suitability for data VIF hosting. RDB also serves as a mechanism for signaling other nodes when they have been configured to host a new VIF.

One VIF manager instance, designated as the coordinator, is responsible for reassigning the VIFs of nodes that are down by opening a single RW transaction to publish the updated configuration to copies of a replicated database residing on each node. The other instances of the VIF manager in the cluster are responsible for reassigning VIFs in response to the new configuration. The VIF manager instances use RO transactions to read the new configuration.

A. Cluster Environment

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
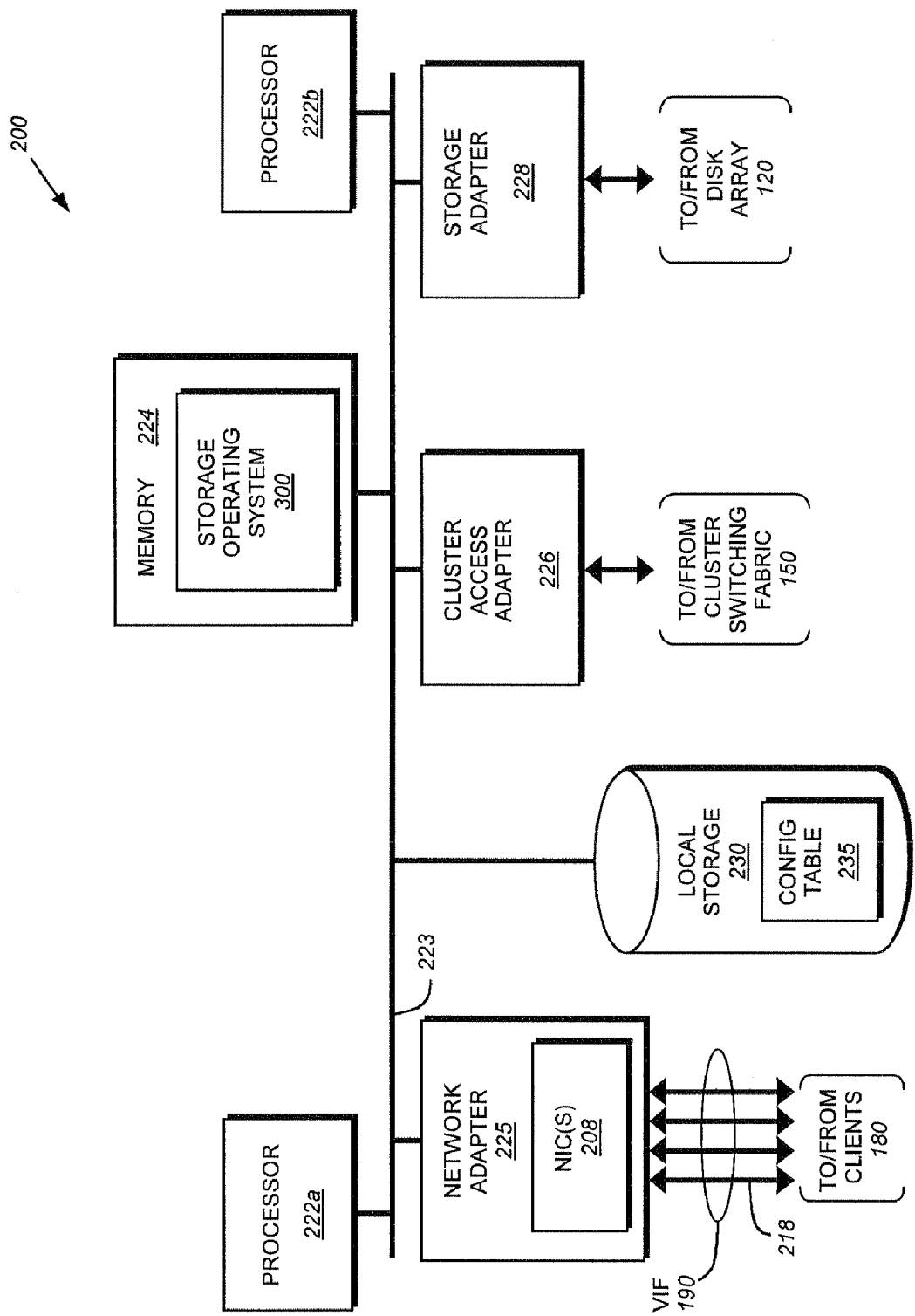
FIG. 2 is a schematic block diagram of a node in accordance with an embodiment of the present invention.

FIG. 2 is a schematic block diagram of a node 200 that is illustratively embodied as a storage system comprising a plurality of processors 222$a,b$, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 400 (see FIG. 4). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222$a$ executes the functions of the N-module 310 on the node, while the other processor 222$b$ executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 may comprise a network interface card (NIC) having the mechanical, electrical and signaling interface circuitry needed to connect the node 200 to the network 140 and ultimately to clients 180. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

In a clustered environment, a network interface may be managed as a virtual interface (VIF) 190 and assigned to ports distributed throughout the cluster. The VIF 190 can thereby be disassociated from any particular NIC. Each NIC may include a single interface 218 such that, for a 4-link VIF, the node includes 4 NICs 208. Alternatively, each NIC 208 may include 4 "quad port" interfaces 218, each of which is connected to a link 180 of the VIF 190. VIFs 190 are further described below.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
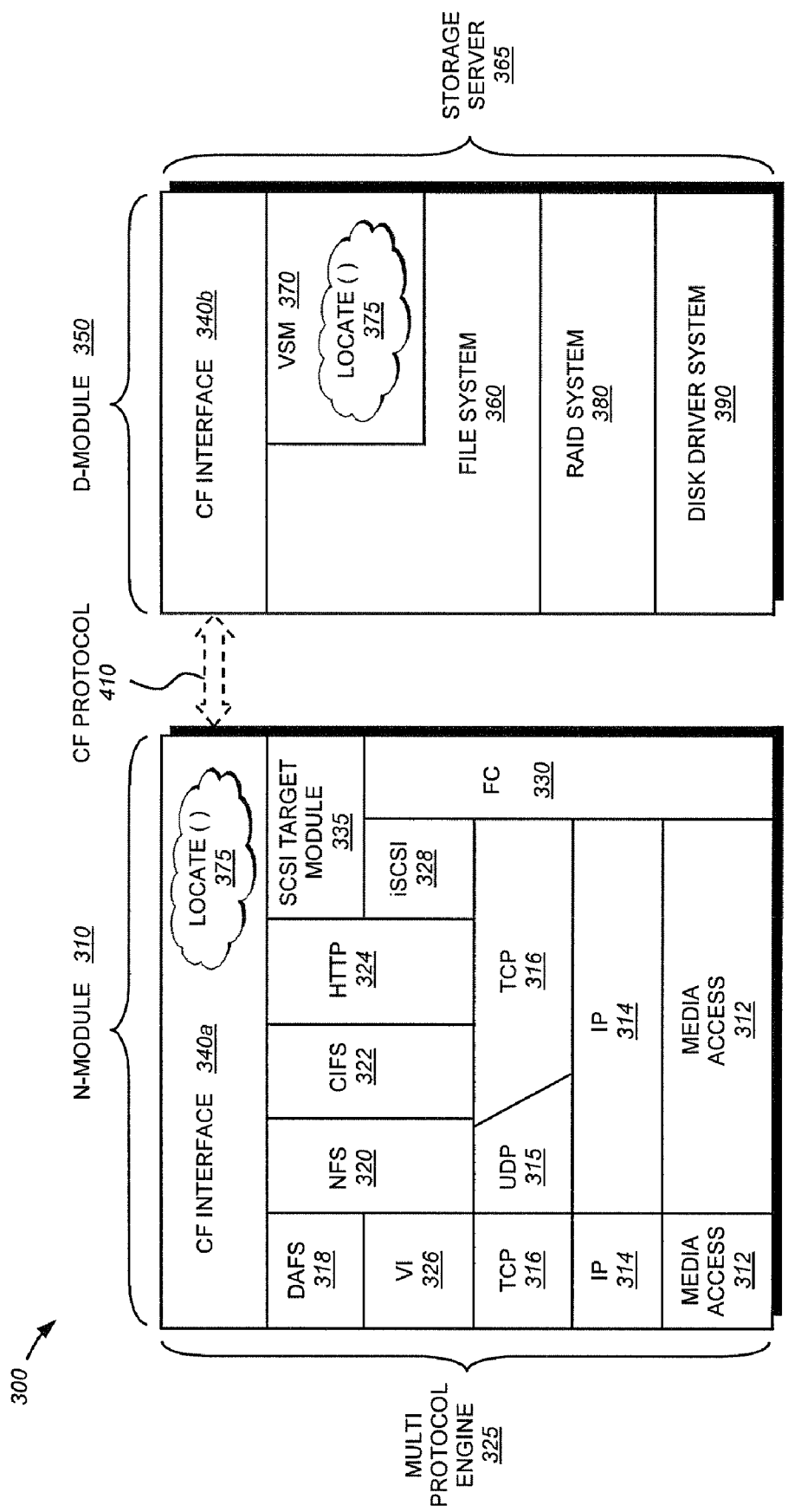
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS). that cooperates with the file system 360 to enable the storage server 365 to service a volume of the SVS. In particular, the VSM 370 implements a Locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 410 (see FIG. 4), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 illustratively provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340*a,b* adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

E. Cluster Management Services

Figure 4:
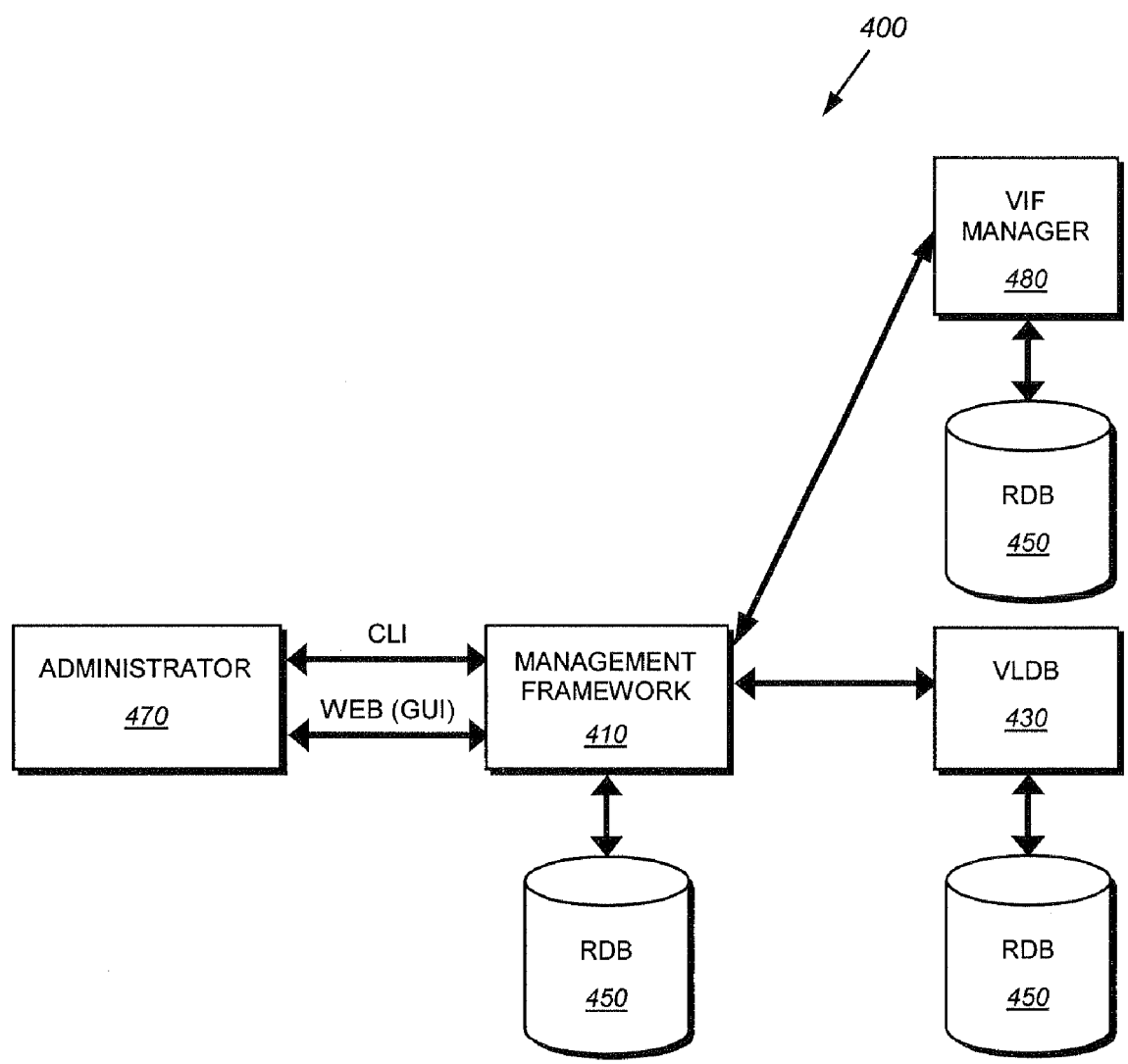
FIG. 4 is a schematic block diagram illustrating a collection of management processes in accordance with an embodiment of the present invention.

FIG. 4 is a schematic block diagram illustrating a collection of management processes that execute as user mode applications 400 on the storage operating system 300 to provide management of configuration information (i.e. management data) for the nodes of the cluster. To that end, the management processes include a management framework process 410 and a volume location database (VLDB) process 430, each utilizing a data replication service (RDB 450) linked as a library. The management framework 410 provides a user to an administrator 470 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 430 is a database process that tracks the locations of various storage components (e.g., SVSs, flexible volumes, aggregates, etc.) within the cluster 100 to thereby facilitate routing of requests throughout the cluster.

A VIF manager 480 provided by the present invention uses an agreement between quorum participants in a cluster to coordinate the VIFs hosted on the nodes. The invention provides a system wherein a coordinator publishes a new configuration and other nodes in the quorum react to the publication. If for some reason a particular node, such as an unhealthy node, can not fulfill requirements of the newly published configuration then a secondary transaction is invoked by the unhealthy node to republish a second failover configuration. The inventive VIF manager minimizes communications of the RDB service between nodes.

E. The Virtual Interfaces

Figure 5:
FIG. 5 is a schematic block diagram illustrating a virtual interface (VIF) in accordance with an illustrative embodiment of the present invention.

FIG. 5 illustrates a virtual interface (VIF) data structure in more detail in accordance with an illustrative embodiment of the invention. A VIF 500 consists of an address 510 (e.g., an IP address), netmask 520, routes 530, VIF ID 540, virtual server id 550, and a set of network ports where it be hosted 560. There are generally three primary VIF types: data VIFs, cluster VIFs, and management VIFs. Data VIFs 190 are configured on ports on the client facing network, such as ports on the NICs 208 of network adapter 225 as shown in FIG. 2. Cluster VIFs and management VIFs can be configured on ports on the cluster access adaptor 226. The illustrative failover method described herein involves failover of the data VIFs 190.

The client facing network exports NFS and CIFS access to data. The ports on a node are assigned to service a particular network (data/cluster/management). VIFs are assigned to ports on the appropriate network. Only data VIFs 190 may be assigned to the ports of a client facing network. Cluster and management VIFs may be assigned to the ports of a cluster network. The client network exposes VIFs 190 for data access via the NFS and CIFS protocols.

Although embodiments are described generally herein in terms of configuring data VIFs 190 to ports on network nodes, alternative embodiments can be employed to provide VIF failover wherein the ports may not necessarily be collocated with a network node. For example, in an alternative embodiment, VIFs may be assigned to ports that are connected to a remote N-module, switch, router or the like in communication with a network.

The VIF manager will failover the VIFs 190 in the case of a network port failure, network interface failure, cable failure, switch port failure or node failure, for example. At all times, including during the failover process, any particular VIF is hosted by at most one node at time, but can never be activated on multiple ports at a time.

The VIF manager is responsible for failing over a VIF upon a VIF failure if the VIF has an associated failover rule. A failover rule generally includes a set of network ports that may serve as hosts for the VIF. In an illustrative embodiment, the default failover rule for a VIF can be that no failover is enabled.

The VIF manager is responsible for enabling the data VIFs, 190 cluster VIFs and management VIFs. The VIF manager's primary responsibility is configuring, activating, monitoring and failing over VIFs. During boot, the VIF manager is started by the management framework 410. A discovery mechanism of the management framework 410 discovers devices managed by the N-module as well as other devices on the node. The management framework 410 queries and configures network interfaces i.e., NICs 208 on each node. The VIF manager stores information needed to manage the ports and network interfaces.

VIFs are failed over based on failover rules. Failover rules are configured for failover enabled VIFs. Any VIF can have a failover rule but there are restrictions on cluster and management VIFs. Management and cluster VIF failover rules can only contain ports local to the node. Data VIFs can have ports anywhere in the cluster.

In an illustrative embodiment, when a node suffers a failure all the failover enabled data VIFs are moved to an available network port that is specified in the failover rule. When a link goes down (i.e., loses carrier sense on any network port in the cluster) the VIF is moved to the port indicated by its associated failover rule (if it has one). If a VIF is not failover enabled it may be considered "incorrigible" so that no subsequent hosting of the failed VIF is attempted.

A failover rule consists of a set of ports that the VIF can fail to and an ordering on the ports that indicates the desirability of the ports. The first port in the rule is considered the home port. The VIF manager can revert any VIF to its home port as long as that port is active. The data VIF failover rules allow a system administrator to specify a set of network ports that a data VIF may failover to and an ordering on these ports. These ports may either be local or remote to a host node. An exemplary default data VIF failover rule is no failover enabled. Data VIF failover rules may be shared by other data VIFs. This allows an administrator to easily configure VIFs that can share the same failover rule and home port.

Two examples of failover rules for port selection on failure are illustratively the priority-order rule and the next-available rule. According to the priority-order rule, when a port fails, a VIF moves to the highest priority available port on the same node, or if no ports are available on the same node, the VIF moves to the highest priority port in the rule (home if available). When a node fails, the VIF moves to the highest priority available port in the rule. By providing unique priorities the priority of a port can be specified within the node as well as within the rule.

According to the next-available rule, when a port fails, a VIF moves to the next available port on the same node or if no ports are available on the same node, the VIF moves to the highest priority port in the rule (home if available). When a node fails, the VIF moves to the next port in the rule.

An instance of the VIF manager runs on each node in the cluster. The VIF manager instances use RDB to store their configuration information and use the RDB quorum mechanism to determine a node's suitability for data VIF hosting. RDB also serves as a mechanism for signaling other nodes when they have been configured to host a new VIF.

One instance of the VIF manager is designated the failover coordinator. The coordinator is co-located on a node with the RDB master. The coordinator is responsible for reassigning the VIFs of nodes that are down. The other instances (secondaries) of the VIF manager in the cluster are responsible for reassigning VIFs upon link failures. The coordinator also performs the functions of a secondary with respect to its local node.

Figure 6:
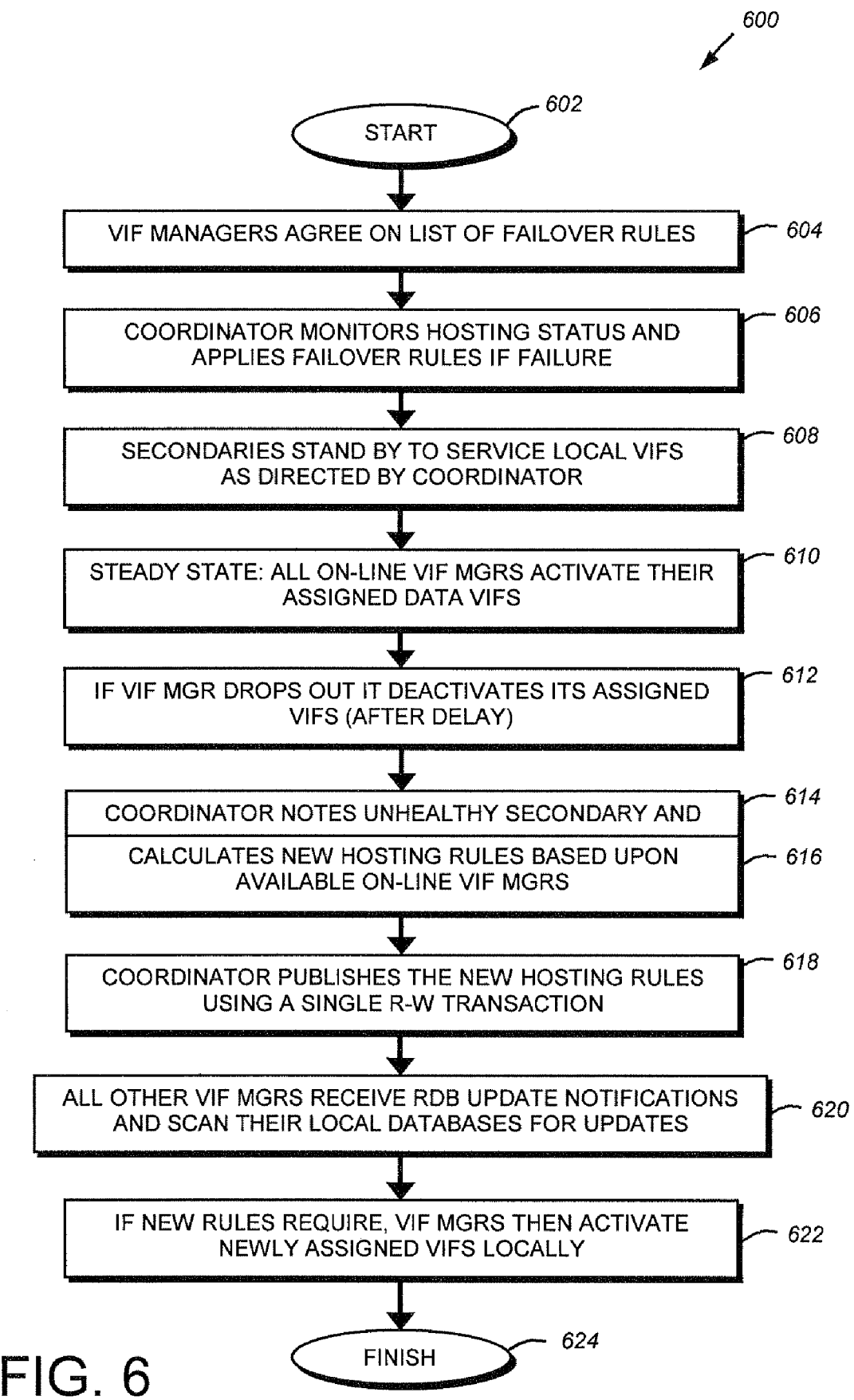
FIG. 6 is a flowchart detailing steps of a procedure for providing VIF failover according to an illustrative embodiment of the present invention.

FIG. 6 is a flowchart describing a VIF failover procedure according to an illustrative embodiment of the invention. The illustrative failover procedure begins at step 602 and continues to step 604 in which all of the VIF manager instances in a cluster agree on a list of failover rules for the data VIFs. All of the VIF manager instances have access to a current VIF location assignment table as replicated runtime data. In step 606, the VIF manager running on the RDB master node performs the role of coordinator by monitoring overall hosting status and applying the failover rules in response to failures. In step 608 the secondary instances stand ready to perform services on their local nodes as directed by the coordinator.

The online VIF managers activate their assigned data VIFs in step 610. In step 612, when an individual VIF manager instance drops out of quorum, it deactivates its VIFs (after a suitable delay for hiccup avoidance in the CIFS protocol). In step 614, the coordinator notes the unhealthy secondary. After a similar delay, the coordinator calculates new VIF hosting rules in step 616 based on the available online partners. In step 618, the coordinator then publishes changes to the new VIF assignment table using a single RW transaction. For example, the coordinator can open a single RW transaction of the RDB including operations which write an updated VIF assignment table to replicated databases on each node of a cluster. The RDB service notifies each of the VIF manager instances that an update has occurred. In step 620, the other VIF manager instances wake up in response to their RDB update notifications, and scan their local databases to learn their new hosting responsibilities using read-only (RO) transactions. The VIF managers activate their newly assigned VIFs locally in step 622. The successful failover then completes in step 624.

In the successful failover procedure, only one RW transaction is required for the entire set of VIFs that failover. The failover process as shown in FIG. 6 publishes only the new hosting responsibilities to all members, ensuring that all agree. The individual VIF manager instances are independently required to conform. The consequent hosting of the VIFs in response to published changes require no additional transactional resource because such hosting merely conforms to the steps that had been previously committed by the VIF managers.

When the coordinator assigns a VIF-hosting responsibility to an online instance, that instance either honors or reassigns the responsibility. On occasion, some local error may prevent a VIF manager instance from activating its assigned VIFs. When this occurs, the illustrative procedure requires the affected VIF manager instance to recognize the error, reapply the failover rule for the VIFs that it cannot host, and then publish the new hosting rules under a single new RW transaction—just as the coordinator did originally. All instances share the replicated failover rule set, so each is capable of publishing new hosting rules.

Figure 7:
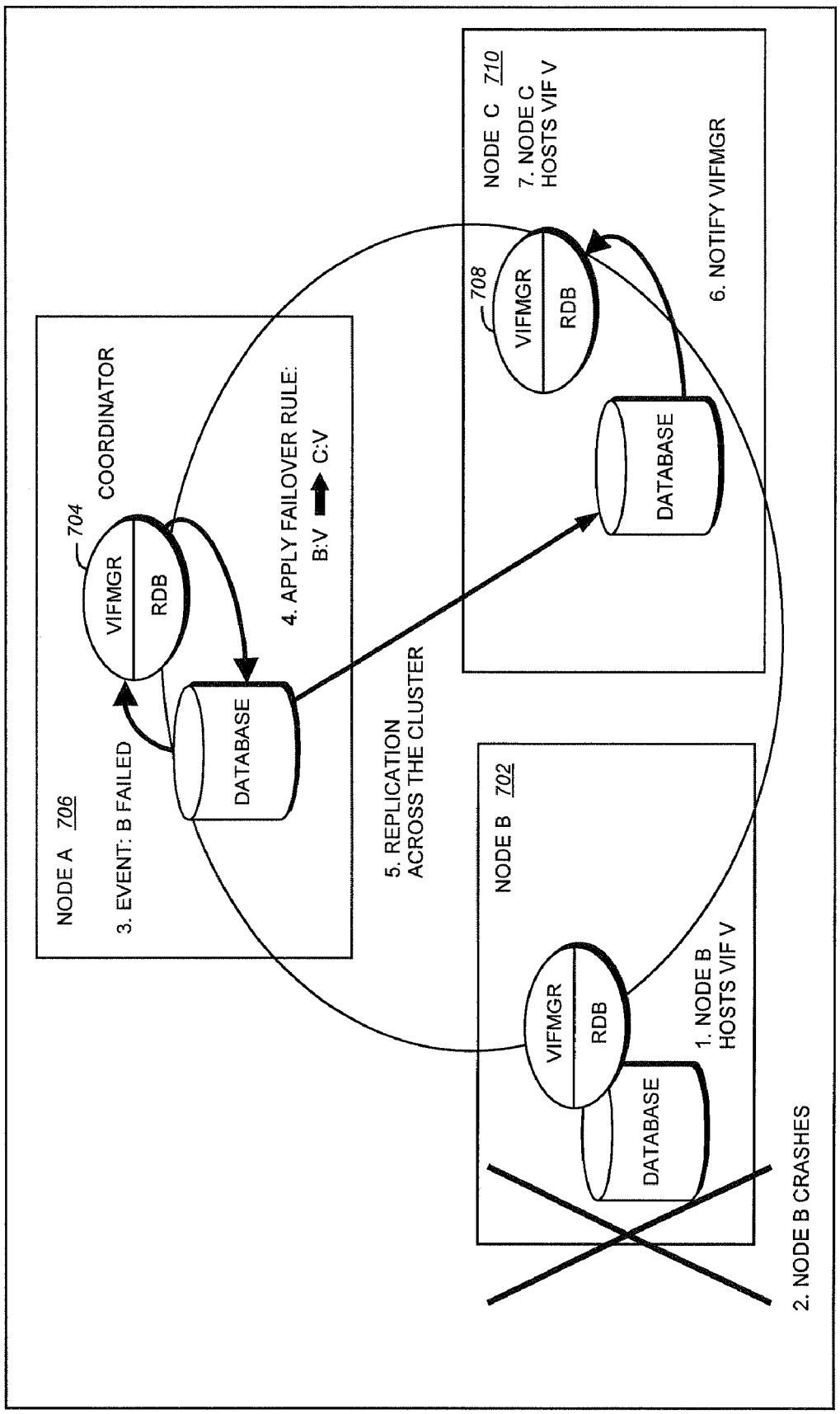
FIG. 7 is a schematic block diagram of a cluster of storage system nodes implementing a VIF failover process according to an illustrative embodiment of the present invention.

FIG. 7 illustrates a VIF failover process for a disabled node in a 3-node cluster according to an illustrative embodiment of the invention. In step 1, node B 702 hosts VIF V. In step 2, node B 702 becomes disabled. Then, in step 3, the coordinator 704 on node A 706 receives a "B offline" event notification. In step 4, the coordinator 704 applies the failover rule for VIF V and reaches a decision to host VIF V on the healthy node C 710. In step 5, the coordinator 704 publishes the decision via transactional replication. In step 6, the VIF manager instance 708 on node C 710 accepts the new hosting rule. In step 7, the VIF manager instance 708 on node C 710 takes ownership of VIF V. Note that both the coordinator VIF manager 704 on node A 706, and the secondary VIF manager 708 on node C 710, remain online throughout this process.

The illustrative embodiments described herein use the RDB services notion of online/offline status as a proxy for general node health. The RDB service provides online/offline notifications in response to changes in a node's health status. The RDB service also internally maintains the health information for all nodes, and provides up-to-date aggregated cluster health information through a health monitor interface. The VIF manager coordinator uses the notifications to trigger failover activity, and uses the aggregated health view in its decision-making algorithm. The illustrative embodiments also use the offline state as a form of implicit message passing during network partition. An offline node relinquishes its VIFs, and its online peers know that it has done so by virtue of the fact that time has elapsed while the node is offline.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention

What is claimed is:

1. A method for managing virtual interfaces (VIFs) comprising:
   providing a VIF manager instance on each node of a cluster, wherein one of the VIF managers is designated as coordinator;
   providing a set of VIF failover rules for all VIFs in the cluster to each VIF manager via a replication database (RDB) service;
   using a single read-write (RW) transaction of the RDB service by the coordinator to publish revised VIF hosting assignments pursuant to the VIF failover rules in response to a VIF failure; and
   hosting, by each VIF manager of each node affected by the published revised VIF hosting assignments, VIFs pursuant to the published revised VIF hosting assignments without performing additional RW transactions by any VIF manager in the cluster.

2. The method of claim 1 further comprising:
   if an affected node cannot host VIFs pursuant to the published revised VIF hosting assignments then,
   using the single RW transaction of the RDB service by a VIF manager on the affected node to publish new revised VIF hosting assignments pursuant to the VIF failover rules; and
   hosting VIFs by affected nodes pursuant to the published new revised VIF hosting assignments.

3. The method of claim 1 wherein the VIF managers comprise an RDB quorum.

4. The method of claim 3 further comprising:
   deactivating, by a particular VIF manager, VIFs hosted by the particular VIF manager when the particular VIF manager drops out of quorum 5. The method of claim 1 further comprising:
   delaying publication of the revised VIF hosting assignments for a time sufficient to ensure that the VIF failure is not a transient failure.

6. The method of claim 1 comprising:
   calculating the new VIF hosting assignments by the coordinator based on remaining healthy VIF managers in accordance with the failover rules.

7. The method of claim 1 comprising:
   receiving an RDB update notification by each secondary VIF manager instance upon publication by the coordinator of the revised VIF hosting assignments; and
   in response to receiving the RDB update notification, scanning by each VIF manager its local database to learn its new hosting responsibilities, the receiving and scanning being performed using read-only (RO) transactions.

8. The method of claim 1, wherein each node comprises a data storage system.

9. A cluster of data storage system nodes, each node comprising:
   a replication database service; and
   a virtual interface (VIF) manager in communication with the replication database service;
   the replication database service including a VIF assignment table and a set of failover rules for each of a plurality of VIFs in the cluster; and
   a failover process designating one of the VIF managers in the cluster as coordinator, wherein the coordinator publishes a revised VIF assignment table according to the failover rules in response to a VIF failure, the publication being performed by a single read-write transaction, wherein each VIF manager of each node affected by the published revised VIF hosting assignments hosts VIFs without performing additional RW transactions.

10. The cluster according to claim 9, wherein the revised VIF assignment table is calculated by the coordinator according to the failover rules and the available healthy VIF managers.

11. The cluster according to claim 9, wherein the failover process comprises:
   an RDB update notification received by each VIF manager instance upon publication by the coordinator of the revised VIF assignment table; and
   in response to receiving the RDB update notification, each VIF manager to scan its local database to learn its new hosting responsibilities, wherein read-only (RO) transactions are used to receive the RDB update notification and scan the local database.

12. The cluster according to claim 11, wherein the failover process comprises:
   each VIF manager to perform new VIF hosting responsibilities in response to the revised VIF assignment table.

13. The cluster according to claim 12, wherein in response to a VIF manager being unable to perform its new hosting responsibility, a new revised VIF assignment table is published by the VIF manager using a single read-write transaction of the RDB service.

14. The cluster according to claim 13, wherein the new revised VIF assignment table is calculated by the VIF manager according to the failover rules and the available healthy VIF managers.

15. A system for managing virtual interface (VIF) failover comprising:
   a VIF manager instance on each node of a network cluster, wherein one of the VIF managers is designated as coordinator;

a set of VIF failover rules for all VIFs in the cluster to each VIF manager via a replication database (RDB) service;

means for using a single read-write (RW) transaction of the RDB service by the coordinator to publish revised VIF hosting assignments pursuant to the VIF failover rules in response to a VIF failure; and means for hosting VIFs by affected nodes pursuant to the published revised VIF hosting assignments without performing additional RW transactions by any VIF manager instance in the cluster unless an affected node cannot host VIFs pursuant to the published revised VIF hosting assignments.

16. A computer readable medium containing executable program instructions executed by a processor, comprising:

program instructions that configure a virtual interface (VIF) failover manager instance on each node of a cluster, wherein one of the VIF managers is designated as coordinator;

program instructions that provide a set of VIF failover rules for all VIFs in the cluster to each VIF manager via a replication database (RDB) service;

program instructions that use a single read-write (RW) transaction of the RDB service by the coordinator to publish revised VIF hosting assignments pursuant to the VIF failover rules in response to a VIF failure; and program instructions that host, by each VIF manager of each node affected by the published revised VIF hosting assignments, VIFs pursuant to the published revised VIF hosting assignments without performing additional RW transactions by any VIF manager instance in the cluster unless an affected node cannot host VIFs pursuant to the published revised VIF hosting assignments.

17. A computer readable medium according to claim 16 further comprising:

program instructions that use a single read-write (RW) transaction of the RDB service by a VIF manager on an affected node to publish new revised VIF hosting assignments pursuant to the VIF failover rules if the affected node cannot host VIFs pursuant to the published revised VIF hosting assignments; and program instructions that host VIFs by affected nodes pursuant to the published new revised VIF hosting assignments.

18. The computer readable medium according to claim 16 further comprising:

program instructions that deactivate, by a particular VIF manager, VIFs hosted by the particular VIF manager when the particular VIF manager drops out of quorum.

19. The computer readable medium according to claim 16 further comprising:

program instructions that delay publication of the revised VIF hosting assignments for a time sufficient to ensure that the VIF failure is not a transient failure.

20. The computer readable medium according to claim 16 further comprising:

program instructions that calculate the new VIF hosting assignments by the coordinator based on remaining healthy VIF managers in accordance with the failover rules.

21. A method for managing virtual interfaces (VIFs) comprising:

providing a VIF manager instance on a plurality of network elements, wherein one of the VIF managers is designated as coordinator;

providing a set of VIF failover rules for VIFs in the network to the VIF managers via a replication database (RDB) service;

using a single read-write RDB transaction by the coordinator to publish revised VIF hosting assignments pursuant to the VIF failover rules in response to a VIF failure and implement hosting of VIFs according to the revised hosting assignments; and using read-only RDB transactions, without using any additional read-write RDB transactions, to respond to the revised VIF hosting assignments.

22. The method of claim 21, wherein the plurality of network elements include members of the set consisting of nodes, routers, N-modules, D-modules and switches.

23. A method for managing virtual interface (VIF) failover comprising:

publishing failover rules in a replicated database;

using read-only RDB transactions to respond to the publication of failover rules; and moving failover enabled data VIFs to an available network port specified in a failover rule in response to a node suffering a failure.

24. A method for managing virtual interfaces (VIFs) comprising:

providing a VIF manager instance on each node of a cluster, wherein one of the VIF managers is designated as coordinator;

providing a set of VIF failover rules for all VIFs in the cluster to each VIF manager via a replication database (RDB) service;

using a first single read-write (RW) transaction of the RDB service by the coordinator to publish revised VIF hosting assignments pursuant to the VIF failover rules in response to a VIF failure and to host VIFs by the affected nodes pursuant to the published VIF hosting assignments;

in response to an affected node being unable to host VIFs pursuant to the published revised VIF hosting assignments, utilizing a second single RW transaction of the RDB service by a VIF manager on the affected node to publish new revised VIF hosting assignments pursuant to the VIF failover rules; and hosting VIFs by affected nodes pursuant to the published new revised VIF hosting assignments.

25. A method for managing virtual interfaces (VIFs) comprising:

providing a VIF manager instance on each node of a cluster, wherein one of the VIF managers is designated as coordinator, and the VIF managers comprise an RDB quorum;

deactivating, by a particular VIF manager, VIFs hosted by the particular VIF manager when the particular VIF manager drops out of quorum;

providing a set of VIF failover rules for all VIFs in the cluster to each VIF manager via a replication database (RDB) service; and using a single read-write (RW) transaction of the RDB service by the coordinator to publish revised VIF hosting assignments pursuant to the VIF failover rules in response to a VIF failure and to host VIFs by the affected nodes pursuant to the published VIF hosting assignments.

26. A cluster of data storage system nodes, each node comprising:

a replication database service;

a virtual interface (VIF) manager in communication with the replication database service;

the replication database service including a VIF assignment table and a set of failover rules for each of a plurality of VIFs in the cluster; and a failover process designating one of the VIF managers in the cluster as coordinator, wherein the coordinator publishes a revised VIF assignment table according to the failover rules in response to a VIF failure using a first single-read write transaction, wherein each VIF manager performs new VIF hosting responsibilities in response to the revised VIF management table, and in response to a VIF manager being unable to perform its new hosting responsibility, a new revised VIF assignment table is published by the VIF manager using a second single read-write transaction of the RDB service.

* * * * *